(12) United States Patent
Tomie

(10) Patent No.: US 6,251,492 B1
(45) Date of Patent: Jun. 26, 2001

(54) OPTICAL RECORDING MEDIUM

(75) Inventor: Takashi Tomie, Hino (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/266,773

(22) Filed: Mar. 12, 1999

(30) Foreign Application Priority Data

Apr. 10, 1998 (JP) ................................................. 10-099176

(51) Int. Cl.$^7$ ....................................................... B32B 3/02
(52) U.S. Cl. ...................... 428/64.1; 428/64.4; 428/64.5; 428/64.6; 428/457; 428/913; 430/270.13; 430/495.1; 430/945; 369/283; 369/288
(58) Field of Search .................................. 428/64.1, 64.2, 428/64.4, 64.5, 64.6, 457, 913; 430/270.13, 495.1, 945; 369/283, 288

(56) References Cited

U.S. PATENT DOCUMENTS

| | | | |
|---|---|---|---|
| 5,125,750 | 6/1992 | Corle et al. | 359/819 |
| 5,479,382 | * 12/1995 | Nishida | 369/13 |
| 5,604,003 | * 2/1997 | Coombs | 428/64.1 |
| 5,702,792 | * 12/1997 | Iida | 428/64.1 |
| 6,011,757 | * 1/2000 | Ovshinsky | 369/13 |

OTHER PUBLICATIONS

Terris, B.D., et al., "Ultra–High Density Magneto–Optical Recording Using A SIL," IEEE International Magnetics Conference, pp. CC–01 (Apr., 1996).

Hirota, K., et al., "High Density Phase Change Optical Recording Using a Solid Immersion Lens," IEEE/Lasers and Electro–Optics Society, OSA Technical Digest Series, vol. 8, pp. 30–32 (May, 1998).

Osato, K., et al., "A Rewritable Optical Disk System With Over 10 GB of Capacity," Sony Conference No. WA2, pp. 131–133 (May, 1998).

* cited by examiner

Primary Examiner—Elizabeth Evans

(57) ABSTRACT

An optical recording medium comprising, in the following order, a substrate, a reflecting layer, a lower dielectric layer, an optical recording layer, the optical recording layer recording information by means of change in a physical property of the optical recording layer which is generated by an applied light beam, the change in a physical property of the optical recording layer being conducted at an operating temperature, and an upper dielectric layer, wherein the substrate has a thermal deformation temperature lower than the operating temperature and the optical recording medium further comprises a thermally insulating layer between the substrate and the reflecting layer.

12 Claims, 4 Drawing Sheets

×167　0.1mm

SLIGHT DEFECT | NO DEFECT

OPTICAL RECORDING MEDIUM

BACKGROUND OF THE INVENTION

1. Field of the Invention

The present invention relates to an optical recording medium, in which writing, reading and/or erasing of information is conducted by utilizing a light beam or, more specifically, to an optical recording medium comprising a recording layer formed on a substrate in which a laser beam is applied to the recording layer from the side of the recording layer without passing through the substrate.

2. Description of the Related Art

The most optical recording media are the substrate side light incident type in which a laser beam is applied to the recording layer through a transparent substrate. Recently, however, optical recording media of the recording layer side light incident type, in which a laser beam is applied from the side of the deposited layers without passing through the substrate, have attracted attention as described in the magazine "Electronics" vol. 41, No. 5, May 1996, pp87–91.

Investigation of the recording layer side light incident type optical recording medium has begun because it has a higher recording density than the conventional substrate side light incident type optical recording medium. However, practical recording and reproducing using this type recording medium has not been reported. Accordingly, it appears that various problems must be solved before this type of medium is available for practical use.

Magneto-optical recording media and phase change-type recording media would be such possible optical recording media.

In a magneto-optical recording medium, light, particularly a laser beam, is applied to a recording layer to raise the temperature of the recording layer and reduce the coercive force of the recording layer, while the magnetization direction at the portion where light is applied changes by an external magnetic field to record or erase information. The temperature of the recording layer reaches about 200° C.

A phase change-type recording medium utilizes a reversible structural change or a phase change between amorphous and crystal states of a material made by application of light, particularly a laser beam, for recording or erasing information. The temperature of the recording layer reaches about 600° C. when recording and to about 170° C. when erasing. The phase change-type recording medium has an advantages of high speed information processing and a high recording capacity. The phase change-type recording medium also has a merit of a low cost since the structure of a driver therefor is simpler than the driver for the magneto-optical recording medium.

The typical structure of these optical recording media comprises a stack of inorganic layers deposited on a transparent disc of polycarbonate by evaporation or sputtering. Commercial discs usually have a structure of polycarbonate (PC) substrate/lower dielectric layer/recording layer/upper dielectric layer/reflecting layer/organic protecting layer. The recording layer of the magneto-optical recording medium is made of a rare earth and transitional metal alloy such as TbFeCo and the recording layer of the phase change-type recording medium is made of a carcogen alloy such as AgInSbTe or GeSbTe. The dielectric layer of the magneto-optical recording medium is made of a nitride such as $Si_3N4$ and the dielectric layer of the phase change-type recording medium is made of a ZnS-based material such as $ZnS \cdot SiO_2$.

The phase change-type recording medium typically utilizes a crystal state of a recording layer as the erased state of information and an amorphous state of the recording layer, formed through fusion and rapid cooling using a high power laser beam, as the recorded state of information. The recording layer of a phase-change-type recording medium is amorphous when it is originally deposited, which is then entirely annealed to convert to a crystal state, i.e., the erased state, before it is used for recording. The entire annealing is conducted by using a laser beam, for example, with a spot of a width of 1–3 $\mu$m and a length of about 100 $\mu$m and with a power of about 1 Watt. This step of the entire annealing is called the initialization or initial crystallization.

In contrast to the above commercial typical optical discs, the recording layer side light incident type optical recording media, which are being investigated, would have a structure which has the order of the stack of the layers is reversed from that of the conventional one. That is, the recording media have a structure of PC substrate/reflecting layer/lower dielectric layer/recording layer/upper dielectric layer.

SUMMARY OF THE INVENTION

The present invention has the object of developing a recording layer side light incident type optical recording medium as mentioned above and concerns a solution to a new problem which the present inventor has discovered.

Namely, while investigating recording layer side light incident type optical recording media having a structure of PC substrate/reflecting layer/lower dielectric layer/recording layer/upper dielectric layer, the present inventor discovered that a PC substrate was thermally deformed by application of a laser beam from the recording layer side to form an orange skin-like texture.

More particularly, the above problem became significant when a laser beam with a short wavelength, a red beam, was used for the purpose of obtaining a high recording density and the thickness of the lower dielectric layer was made thinner to obtain an appropriate reflectivity therefor. Also, this problem became significant when the initial crystallization was conducted in a phase change-type optical recording medium. It is obvious that an optical recording medium having a thermally deformed substrate is not suitable or acceptable for a practical optical recording medium.

The present invention provides a recording layer side incident type optical recording medium in which the above problem discovered during an investigation into high density optical recording has been solved and which is useful in creating a practical medium.

Thus, the present invention resides in an optical recording medium, comprising in the following order:

a substrate, a reflecting layer on said substrate, a lower dielectric layer on said reflecting layer, an optical recording layer on said lower dielectric layer, said optical recording layer recording information by means of a change in a physical property of the optical recording layer which is generated by an applied light beam, said change in a physical property of the optical recording layer occurring at an operating temperature, and an upper dielectric layer on said optical recording layer, wherein said substrate has a thermal deformation temperature lower than said operating temperature and said optical recording medium further comprises a thermally insulating layer between said substrate and said reflecting layer.

Because the inventor searched for a solution to the orange skin-like texture problem found in a recording layer side light incident type optical recording medium having a structure of PC substrate/reflecting layer/lower dielectric layer/recording layer/upper dielectric layer, the present inventor considers that the cause of the above problem is elevation of the temperature of a plastic substrate to a temperature higher than the thermal deformation temperature of the plastic substrate, which is heated by heat conduction from the recording layer heated by application of a laser beam.

Further, the present inventor discovered that significant alleviation of the problem can be obtained by inserting a thermally insulating layer of a dielectric material between the plastic substrate and the reflecting layer and a way to make the media practically useful was thus created.

DETAILED DESCRIPTION OF THE PREFERRED EMBODIMENTS

The optical recording medium of the present invention is a recording layer side light incident type optical recording medium having a basic structure comprising, on one or both sides of a substrate, a thermally insulating layer, a reflecting layer, a lower dielectric layer, a recording layer and an upper dielectric layer in this order.

Figure 1:
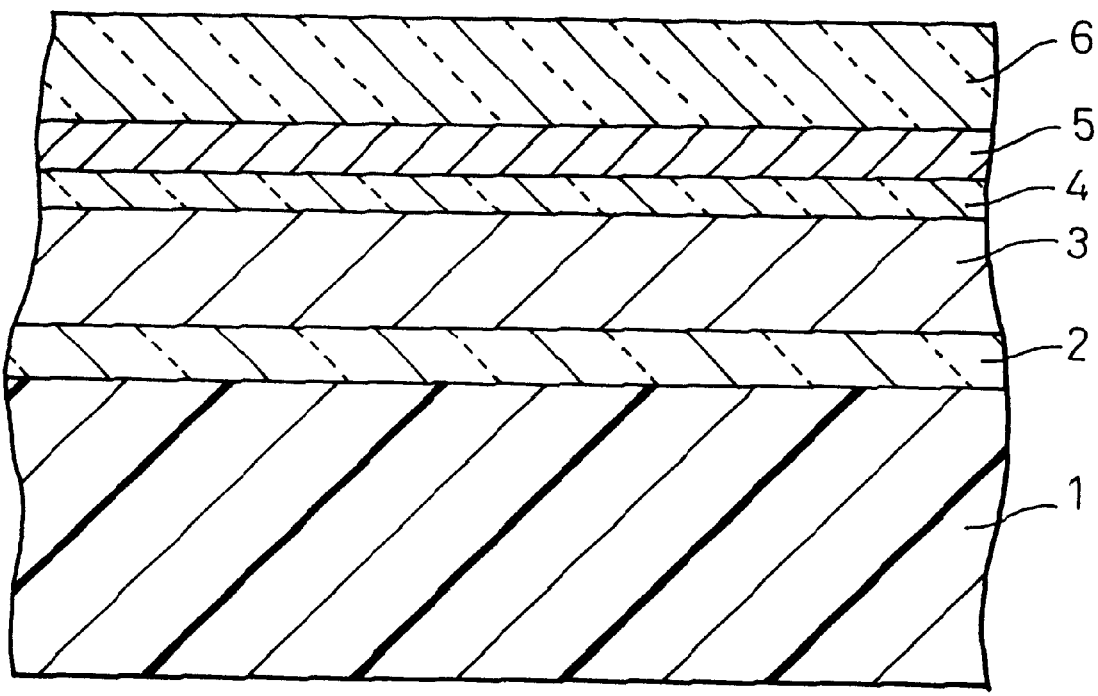
FIG. 1 is a cross-sectional view of an optical recording medium of the present invention.

FIG. 1 shows an example of a typical optical recording medium of the present invention, in which the numeral 1 denotes a substrate, 2 a thermally insulating layer, 3 a reflecting layer, 4 a lower dielectric layer, 5 a recording layer and 6 an upper dielectric layer. The stack of the layers 2 to 6 may be formed on the other side of the substrate 1 if desired.

The substrate used in the present invention is made of a material having a thermal deformation temperature lower than the operating temperature of a recording layer at which recording or erasing of information is conducted. If the substrate has a thermal deformation temperature higher than the maximum operating temperature of a recording layer, the present invention does not have any effect.

The operating temperature of a recording layer, to which the present invention relates, means the highest temperature which the recording layer may reach during operation, i.e., recording and erasing of information or initial crystallization, since the substrate may deteriorate at any operating temperature which the recording layer may have.

For example, when the recording layer is a magneto-optical recording layer, the operating temperature is a temperature at which the coercive force of the recording layer decreases to a value at which the magnetization direction of the recording layer changes by an external magnetization. When the recording layer is a phase change-type recording layer, the operating temperature is the higher temperature at which the recording layer changes from the crystal state to the amorphous state (when fused) or from amorphous state to the crystal state (when annealed). If the substrate has a thermal deformation temperature lower than the lowest operating temperature of the recording layer, of course, the orange skin-like texture problem is more severe and the present invention is more advantageous and essential.

The thermal deformation temperature of a plastic substrate is the temperature at which thermal deformation of the plastic substrate begins under a stress. If the plastic substrate suffers a thermal deformation, for example, at a temperature of the glass transition temperature or at a temperature lower than the glass transition temperature by about 10° C., these temperatures are the thermal deformation temperature. For example, polycarbonate resin typically has the glass deformation temperature of about 135° C., although it depends on the molecular weight, the molecular weight distribution, etc.

The substrate of the present invention may be any thermally deformable materials including polycarbonate, polymethyl methacrylate, alicyclic-polyolefin, etc.

The thermally insulating layer used in the present invention should have a low thermal conductivity and a thickness greater than a certain value.

The scheme of the thermal conduction from the heated recording layer to the substrate is considered as indicated below: The heat of the recording layer penetrates the lower dielectric layer in the thickness direction to the reflecting layer and diffuses through the reflecting layer in the layer face direction but a part of the heat diffusing in the reflecting layer is conducted to the substrate.

Accordingly, it is considered that the problem of the temperature elevation of the substrate does not occur if the heat in the reflecting layer only diffuses in the reflecting layer in the layer face direction and is not conducted to the substrate in the thickness direction. Therefore, the thermal conductivity of the thermally insulating layer should be determined based on the relationship with the thermal conductivity of the reflecting layer. If the reflecting layer has a fairly high thermal conductivity, the heat in the reflecting layer is not easily conducted to the substrate and the thermal insulation property of the thermally insulating layer need not be so high or the thermal conductivity of the thermally insulating layer need not be so low. However, if the reflecting layer does not have a high thermal conductivity, the thermal insulation property of the thermally insulating layer should be sufficiently high or the thermal conductivity of the thermally insulating layer should be sufficiently low. It is therefore generally preferred that the thermal conductivity of the thermally insulating layer is not higher than one tenth of the thermal conductivity of the reflecting layer.

If the thermally insulating layer is thin, the thermal insulation effect is not sufficient. Therefore, the thickness of the thermally insulating layer is preferably not less than about 20 nm.

The thermally insulating layer may be a layer of a carcogenide, a nitride or an oxide or a combination thereof, such as $ZnS \cdot SiO_2$, $ZnS$, $SiN$, $AlSiN$, $Al_2O_3$, $SiO_2$, $Ta_2O_5$, $TiO_2$ or $Y_2O_3$.

Since the reflecting layer is usually an aluminum alloy layer comprising aluminum with an amount up to a several atomic % of Ti, Ta, Cr, Au or the like and the thermal conductivity of the aluminum alloy layer is considered to be in a range of about 50 to 120 W/mK, while the thermal conductivity of the aluminum alloy layer depends on the content of the added metals and decreases as the amount of the added metals increases, the thermal conductivity of the thermally insulating layer is preferably not more than 5 to 12 W/mK, more preferably not more than 2 W/mK.

The thickness of the reflecting layer is usually in a range of 5 to 200 nm, although it is not particularly limited.

It is preferred that the thermally insulating layer is a layer of $ZnS \cdot SiO_2$ having a particularly small thermal conductivity and being a stable amorphous material which is difficult to crystallize by heat. Further, since a $ZnS \cdot SiO_2$ layer is used for the lower and upper dielectric layers in the phase change-type optical recording medium, use of the same material in both the thermally insulating layer and the dielectric layers is also preferred from the manufacturing control point of view. A ZnS•SiO$_2$ layer may be obtained by sputtering a mixture of ZnS and SiO$_2$ with a molar ratio of about 8:2.

The optical recording layer of the present invention is not limited and may be any optical recording layer with an operating temperature higher than the thermal deformation temperature of the substrate. Important optical recording layers with which the present invention is concerned include a magneto-optical recording layer and a phase change-type recording layer.

As described before, the recording layer of the magneto-optical recording medium is typically made of a rare earth and transitional metal alloy such as TbFeCo, DyFeCo, NdTbFeCo, GdFeCo, etc. The thickness of the magneto-optical recording layer may be typically in a range of 10 to 200 nm although it is not particularly limited in the present invention. The recording layer of the phase change-type recording medium is made of a carcogen alloy such as AgInSbTe, GeSbTe, AgGeSbTe, PdGeSbTe, etc. The thickness of the phase change-type recording layer may be typically in a range of 5 to 100 nm although it is not particularly limited in the present invention.

In a magneto-optical recording medium, light, particularly a laser beam, is applied to a recording layer to raise the temperature of the recording layer and reduce the coercive force of the recording layer, while the magnetization direction at the portion where light is applied changes by an external magnetic field to record or erase information. The temperature of the recording layer reaches about 200° C.

A phase change-type recording medium utilizes reversible structural change or phase change between amorphous and crystal states of a material caused by application of light, particularly a laser beam, for recording or erasing information. The temperature of the recording layer reaches more than 500° C., about 600° C., when recording and to about 170° C. when erasing. In the phase change-type recording medium, the initial crystallization is made by applying a laser beam significantly larger than a recording laser beam with an about 1 μm beam size so that a large area is simultaneously heated and the influence of the heat on the substrate would be more significant. For example, the initial crystallization or the entire annealing is conducted using a laser beam with a beam spot size of a width of 1–3 μm and a length of about 100 μm and with a power of about 1 Watt.

The dielectric layers of the magneto-optical recording medium may be made of a nitride such as Si$_3$N4, AlSiN or Ge$_3$N$_4$, Ta$_2$O$_3$, ZnS•SiO$_2$. The dielectric layers of the phase change-type recording medium may be made of a ZnS-based material such as ZnS•SiO$_2$, or Ge$_3$N$_4$, GeCrN, GeAlN, TaN, SiO$_2$, CrO$_2$, etc.

The thickness of the lower dielectric layer is typically in a range of 25 to 60 nm, although it is not particularly limited in the present invention. The thickness of the upper dielectric layer is typically in a range of 30 to 200 nm, although it is not particularly limited in the present invention.

It is possible that any layer from the thermally insulating layer to the upper dielectric layer may be made from more than one layer and that one or more additional layers are inserted somewhere between the thermally insulating layer or reflecting layer and the upper dielectric layer to improve or modify the performance the optical recording medium.

Although it is not necessary, additional layers may be formed on the upper dielectric layer, for example, a lubricating layer and a protecting layer. However, since if there are such additional layers, the distance between the optical head and the recording layer becomes large so that increase in the recording density is made difficult, this is not always preferred.

EXAMPLES

Examples 1–4 and Comparative Examples 1–3

Phase-change-type optical recording media were manufactured. The manufactured optical recording media had a recording layer side light incident type structure in which a thermally insulating layer, a reflecting layer, a lower dielectric layer, a recording layer and an upper recording layer were formed in this order on a plastic substrate. As comparative media, phase-change-type optical recording media having a known structure without a thermally insulating layer were manufactured. In the comparative media, a reflecting layer, a lower dielectric layer, a recording layer and an upper recording layer were formed in this order on a plastic substrate.

The plastic substrate used was a polycarbonate substrate having a diameter of 120 mm and a center hole with an inner diameter of 15 mm. The plastic substrate formed by injection molding had spiral grooves for continuous servo control in an area of 24 to 58 mm radius. The grooves had a depth of 70 nm and a track pitch of 1.10 μm. The both widths of the grooves and lands were about 0.55 μm.

On the recording or grooved surface of the substrate, a recording layer side light incident type medium was formed with the thickness of the thermally insulating layer being varied as shown in Table 1. The thermally insulating layer and the lower and upper dielectric layers were a ZnS•SiO$_2$ layers formed by sputtering a target with ZnS:SiO$_2$=80 mole %:20 mole %. The recording layer was a GeSbTe alloy layer with Ge:Sb:Te=22.2 atomic %:22.2 atomic %:55.6 atomic % and had a thickness of 20 nm. The reflecting layer was an AlCr alloy layer with Al:Cr=97 atomic %:3 atomic % and had a thickness of 150 nm. The reflecting layer was formed on the transparent substrate by magnetron sputtering using an inline sputtering apparatus ILC3102-type, manufactured by ANELVA Corp., in which a target had a diameter of 8 inches and the substrate was revolving around a certain point and on its axis during deposition. The thickness of the layer was controlled by the sputtering time. The thicknesses of the lower and upper dielectric Layers were controlled so as to obtain a reflectivity of the medium after the initial crystallization of about 30% when light with a wavelength of 680 nm was irradiated from the deposited layer side. Specifically, the ZnS•SiO$_2$ layer had a refractive index of 2.13, the lower dielectric layer had a thickness of 15 nm and the upper dielectric layer had a thickness of 105 nm. Table 1 shows the thickness of each layer in the samples in Examples 1–4 and Comparative Examples 1–3.

TABLE 1

| Sample | Insulating Layer (nm) | Reflecting layer (nm) | Lower dielectric layer (nm) | Recording layer (nm) | Upper dielectric layer (nm) |
|---|---|---|---|---|---|
| Ex. 1 | 25 | 150 | 15 | 20 | 105 |
| Ex. 2 | 30 | 150 | 15 | 20 | 105 |
| Ex. 3 | 50 | 150 | 15 | 20 | 105 |
| Ex. 4 | 80 | 150 | 15 | 20 | 105 |

TABLE 1-continued

| Sample | Insulating Layer (nm) | Reflecting layer (nm) | Lower dielectric layer (nm) | Recording layer (nm) | Upper dielectric layer (nm) |
|---|---|---|---|---|---|
| Co. Ex. 1 | 0 | 150 | 15 | 20 | 105 |
| Co. Ex. 2 | 18 | 150 | 15 | 20 | 105 |
| Co. Ex. 3 | 15 | 150 | 15 | 20 | 105 |

On the seven samples manufactured in Examples 1–4 and Comparative Examples 1–3, the initial crystallization was made using a bulk eraser apparatus LK101A-type manufactured by Shibasoku Co., Ltd. The optical head used had a laser beam power of about 1 Watt on the surface of the disc, a wavelength of 810 nm, a numerical apperture (NA) of 0.34 and a spot size of 125 $\mu$m×1.27 $\mu$m and was mounted at an angle of 30 degree from the disc radial direction. The initial crystallization was conducted by rotating the disc at a constant linear velocity of 5 m/sec and moving the optical head at a speed of 86 $\mu$m/rotation (i.e., the head moves 86 $\mu$m in the radial direction during one rotation of the disc). While the disc linear velocity of 5 m/sec and the head speed of 86 $\mu$m/rotation were fixed and the laser beam power was varied in the initial crystallization, the reflectivity from the deposited layer side of the disc and the presence or absence of defects of the plastic substrate were examined. The laser power shown below is expressed as a percent to the maximum output power of about 1 Watt on the disc surface.

The reflectivity was measured of a flat portion of the disc inside the 24 mm radius by a fiber-type spectrophotometer. The reflectivity shown below was the value at 680 nm-wavelength light. The reflectivity of the disc in case of the recording layer of amorphous GeSbTe immediate after sputtered was about 5%. The reflectivity of the disc increases when the recording layer is crystallized. If a sufficient reflectivity, about 30%, was not obtained, it was considered that the crystallization was not sufficient.

The presence or absence of defects (orange skin-like texturing) on the plastic substrate was checked by naked eye observation of the rear side of the plastic substrate and by microscopic observation of the deposited layer side of the disc at a magnitude of 100–400. If there is no defect in the plastic substrate, it is not possible to determine from observation of the substrate from the rear side or the side without grooves whether or not the initial crystallization is completed, because the relatively thick 150 nm AlCr layer does not sufficiently transmit light. However, the present inventor observed the area of the disc where the initial crystallization was made sufficiently by the naked eye. When that area was observed with a microscope, the plastic substrate was deformed and the orange skin-like texture and even wave texture were observed. In the following, the degree of the deformation of the substrate is classified into no, slight, intermediate and significant deformations, which were derived from the results of the naked eye and microscopic observations. The slight deformation means the case when a slight orange skin-like texture is observed by the microscopic observation. The significant deformation means the case when the deformation can be observed from the rear side of the substrate by the naked eye. The intermediate deformation means the case between the slight and significant deformations.

Figure 2:
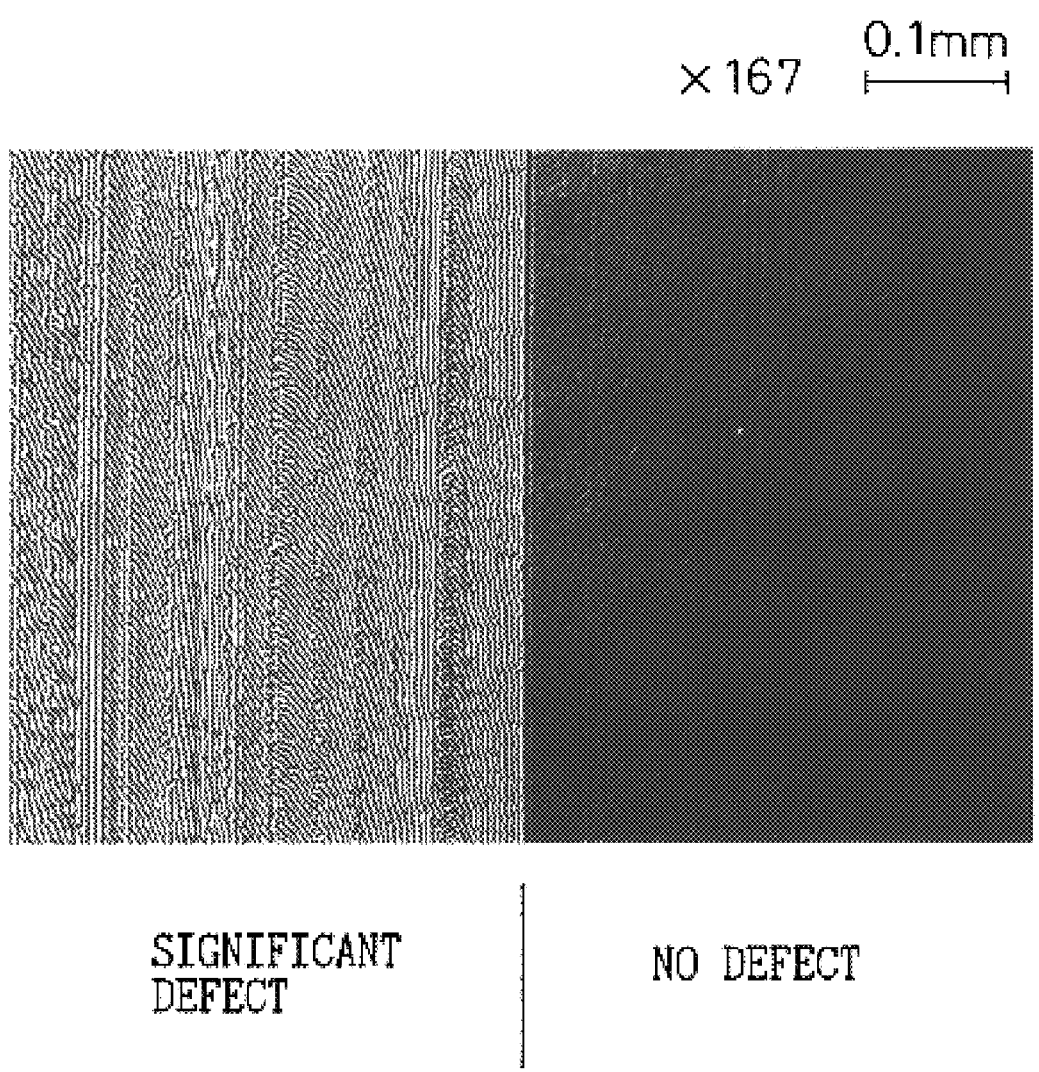
FIGS. 2 to 4 are microscopic images of significant, intermediate and slight thermal deformations of the surface of a plastic substrate.
Figure 3:
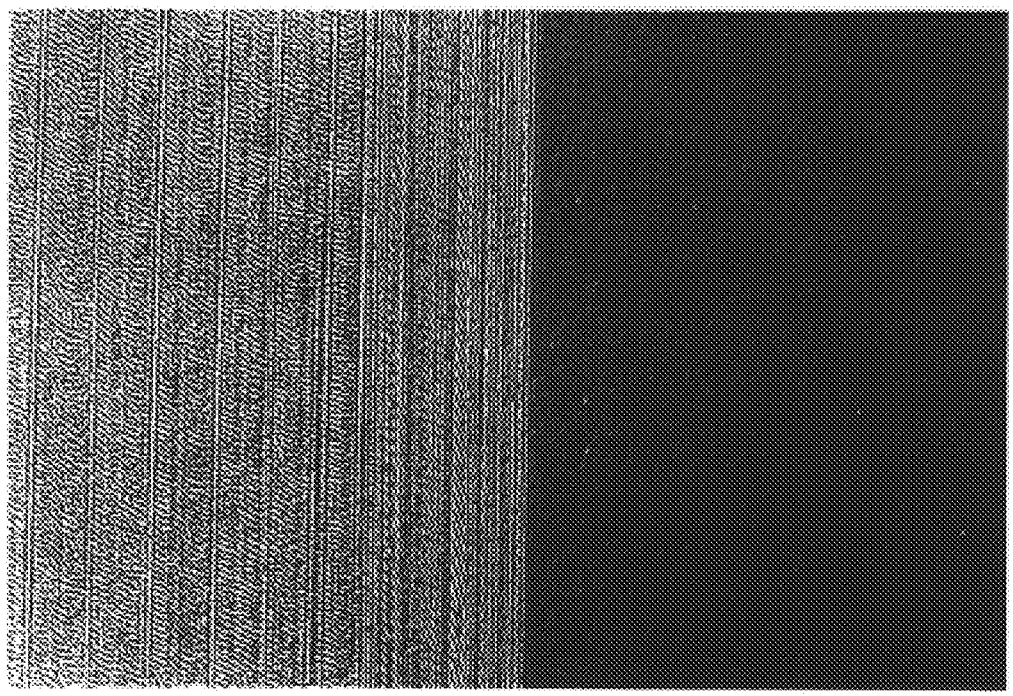
Figure 4:
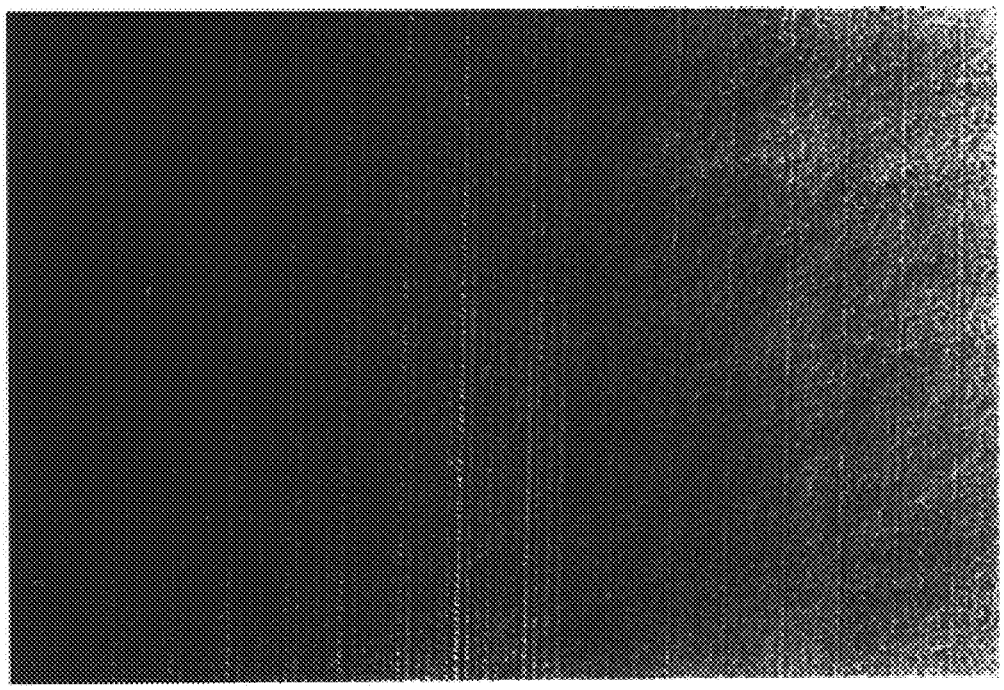

FIGS. 2 to 4 show microscopic images of the significant, intermediate and slight deformations of the substrate taken at a magnitude of 167, respectively. In FIGS. 2 to 4, the right half shows the normal state or the no defect state and the left side shows the significant, intermediate or slight deformation state.

Table 2 shows the results of the evaluation of the samples concerning the reflectivity and the thermal deformation after the initial crystallization with varied powers.

It is seen from Table 2 that the relationship between the initial crystallization and the reflectivity does not depend on the samples and, since the reflectivity becomes the maximum at near the 60% laser beam power, the initial crystallization can be sufficiently made under the conditions near that point. It is considered that the reason why the reflectivity slightly decreases at a laser power of more than 60% is amorphous formations caused by excessive power. It is also considered that the relatively large decrease in the reflectivity at excessive power is caused by the defect or roughened surface of the substrate such as the orange skin-like texture.

It is also seen from Table 2 that although an about 60% laser power is necessary for the sufficient initial crystallization, a defect of the substrate appeared in all the samples of the Comparative Examples at a power of less than 40–50% and, therefore, a practically useful recording medium was not obtained in the Comparative Examples.

At a power of 50%, although the sufficient initial crystallization as defined above cannot be obtained, a practically useful initial crystallization may be obtained. In Example 1, a practically useful recording medium may be thus obtained with the initial crystallization at a power between 50% and 60%. In Examples 2–4, a practically useful recording medium with a sufficient initial crystallization made at the 60% power but with no deformation of the substrate was obtained. Thus, a way to make a practically useful phase change-type optical recording medium of the deposited layer side light incident type has been established.

It is clear that although the above Examples concern the initial crystallization of the phase change-type optical recording medium of the deposited layer side light incident type, the present invention is also applicable to solving the problem in the recording (i.e., changing to amorphous state by fusing and rapid cooling of the recording layer) of a phase change-type optical recording medium of the deposited layer side light incident type as well as the recording or erasing of a magneto-optical recording medium, since in these cases the thermal conduction from the recording layer to the substrate may cause similar problems.

TABLE 2

| | | | Initial crystallization | | | | | |
|---|---|---|---|---|---|---|---|---|
| | | | 35% | 40% | 50% | 60% | 70% | 80% |
| Ex. 1 | Reflectivity (%) | | 12.8 | 26.1 | 29.4 | 30.6 | 29.9 | 28.6 |
| | Defect of substrate | | No defect | No defect | No defect | Slight defect | Intermediate defect | Intermediate defect |

TABLE 2-continued

| | | Initial crystallization | | | | | |
|---|---|---|---|---|---|---|---|
| | | 35% | 40% | 50% | 60% | 70% | 80% |
| Ex. 2 | Reflectivity (%) | 6.8 | 24.7 | 28.4 | 30.0 | 29.7 | 29.0 |
| | Defect of substrate | No defect | No defect | No defect | No defect | Slight defect | Intermedia defect |
| Ex. 3 | Reflectivity (%) | 11.5 | 24.9 | 29.9 | 31.4 | 31.0 | 30.1 |
| | Defect of Substrate | No defect | No defect | No defect | No defect | No defect | Slight defect |
| Ex. 4 | Reflectivity | 9.0 | 23.0 | 30.6 | 32.1 | 31.1 | 31.5 |
| | Defect of Substrate | No defect | No defect | No defect | No defect | No defect | Slight defect |
| Com. Ex. 1 | Reflectivity (%) | 8.9 | 25.7 | 28.4 | 29.0 | 27.3 | 26.2 |
| | Defect of Substrate | No defect | Intermediate defect | Significant defect | Significant defect | Significant defect | Significant defect |
| Com. Ex. 2 | Reflectivity (%) | 18.2 | 27.8 | 29.8 | 30.5 | 30.0 | 27.9 |
| | Defect of Substrate | No defect | No defect | Slight defect | Intermediate defect | Significant defect | Significant defect |
| Com. Ex. 3 | Reflectivity (%) | 7.8 | 22.9 | 27.8 | 31.3 | 30.5 | 28.6 |
| | Defect of Substrate | No defect | Slight defect | Intermediate defect | Significant defect | Significant defect | Significant defect |

What is claimed is:

1. An optical recording medium, comprising in the following order:
   a substrate;
   a thermally insulating layer having a thickness of not less than 20 nm;
   a reflecting layer;
   a lower dielectric layer on said reflecting layer;
   an optical recording layer on said lower dielectric layer, said optical recording layer recording information by means of change in a physical property of the optical recording layer which is generated by a light beam applied to a side of said optical recording medium to which said optical recording layer is closer than said substrate, said change in a physical property of the optical recording layer being conducted at an operating temperature; and
   an upper dielectric layer on said optical recording layer, wherein said substrate has a thermal deformation temperature lower than said operating temperature.

2. The optical recording medium according to claim 1, wherein said thermally insulating layer has a thermal conductivity which is lower than one tenth of the thermal conductivity of said reflecting layer.

3. The optical recording medium according to claim 1, wherein said optical recording medium is a phase change-type optical recording medium in which the recording is conducted by change in crystal state of said optical recording medium.

4. The optical recording medium according to claim 1, wherein said substrate is made of plastic.

5. The optical recording medium according to claim 4, wherein said substrate is made of polycarbonate.

6. The optical recording medium according to claim 1, wherein said reflecting layer is made of an aluminum-based alloy.

7. The optical recording medium according to claim 1, wherein said thermally insulating layer is made of a material selected from the group consisting of carcogenides, nitrides, oxides and combinations thereof.

8. The optical recording medium according to claim 1, wherein said thermally insulating layer is made of a material selected from the group consisting of ZnS•$SiO_2$, ZnS, SiN, AlSiN, $Al_2O_3$, $SiO_2$, $Ta_2O_5$, $TiO_2$, and $Y_2O_3$.

9. The optical recording medium according to claim 1, wherein said thermally insulating layer has a thermal conductivity of lower than 12 W/mK.

10. The optical recording medium according to claim 9, wherein said thermally insulating layer has a thermal conductivity of lower than 2 W/mK.

11. The optical recording medium according to claim 1, wherein said operating temperature is above about 200° C.

12. The optical recording medium according to claim 1, wherein said operating temperature is above about 500° C.

* * * * *